(12) United States Patent
El Defrawy et al.

(10) Patent No.: US 9,614,676 B1
(45) Date of Patent: Apr. 4, 2017

(54) CRYPTOGRAPHICALLY-SECURE PACKED PROACTIVE SECRET SHARING (PPSS) PROTOCOL

(71) Applicant: HRL Laboratories, LLC, Malibu, CA (US)

(72) Inventors: Karim El Defrawy, Santa Monica, CA (US); Joshua D. Lampkins, Gardena, CA (US); Joshua W. Baron, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/816,311

(22) Filed: Aug. 3, 2015

Related U.S. Application Data

(63) Continuation-in-part of application No. 14/449,868, filed on Aug. 1, 2014, which is a continuation of application No. 14/207,483, filed on Mar. 12, 2014, application No. 14/816,311, which is a continuation-in-part of application No. 14/449,115, filed on Jul. 31, 2014, which is a continuation-in-part of application No. 14/207,321, filed on Mar. 12, 2014, application No. 14/816,311, which is a continuation-in-part of application No. 14/207,321, filed on Mar. 12, 2014.

(Continued)

(51) Int. Cl.
*H04L 29/06* (2006.01)
*H04L 9/32* (2006.01)
*H04L 9/30* (2006.01)

(52) U.S. Cl.
CPC .......... *H04L 9/3218* (2013.01); *H04L 9/3013* (2013.01)

(58) Field of Classification Search
CPC ... H04L 63/065; H04L 9/3218; H04L 9/3013; H04L 9/3255
USPC ........................................................ 726/26
See application file for complete search history.

(56) References Cited

U.S. PATENT DOCUMENTS 4,633,470 A   12/1986   Welch et al.
4,926,479 A    5/1990   Goldwasser et al.
(Continued)

OTHER PUBLICATIONS

Harn, Lein, and Changlu Lin. "Strong (n, t, n) verifiable secret sharing scheme." Information Sciences 180.16 (2010): 3059-3064, is considered pertinent because it discloses proactive verifiable sharing scheme.*

(Continued)

*Primary Examiner* — Syed Zaidi
(74) *Attorney, Agent, or Firm* — Tope-McKay & Associates

(57) ABSTRACT

Described is a system for implementing proactive secret sharing. The system uses a Secret-Share protocol to distribute, by a computing device, a block of secret data comprising shares of secret data among a set of computing devices, wherein each computing device in the set of computing devices holds an initial share of secret data. The system uses at least one Secret-Redistribute protocol to periodically redistribute the plurality of shares of secret data among the set of computing devices, wherein each computing device in the set of computing devices holds a subsequent share of secret data from the block of secret data that is independent of the initial share of secret data. Finally, a Secret-Open protocol is initialized to reveal the block of secret data.

21 Claims, 3 Drawing Sheets

Related U.S. Application Data

(60) Provisional application No. 61/780,757, filed on Mar. 13, 2013, provisional application No. 61/861,334, filed on Aug. 1, 2013, provisional application No. 61/861,325, filed on Aug. 1, 2013, provisional application No. 61/780,638, filed on Mar. 13, 2013, provisional application No. 62/032,295, filed on Aug. 1, 2014.

(56) References Cited

U.S. PATENT DOCUMENTS

| | | | |
|---|---|---|---|
| 5,625,692 A * | 4/1997 | Herzberg | H04L 9/085 380/286 |
| 6,035,041 A | 3/2000 | Frankel et al. | |
| 7,003,677 B1 | 2/2006 | Herzberg et al. | |
| 7,313,701 B2 * | 12/2007 | Frankel | G06Q 20/382 705/64 |
| 7,327,847 B2 | 2/2008 | Cachin | |
| 8,824,672 B1 | 9/2014 | Gomathisankaran | |
| 2004/0139146 A1 | 7/2004 | Cachin | |
| 2010/0037055 A1* | 2/2010 | Fazio | H04L 9/3218 713/171 |

OTHER PUBLICATIONS

Damgård, Ivan, et al. "Scalable multiparty computation with nearly optimal work and resilience." Advances in Cryptology—CRYPTO 2008. Springer Berlin Heidelberg, 2008. 241-261.*
Christian Cachin, Klaus Kursawe, Anna Lysyanskaye, and Reto Strobl. "Asynchronous veriable secret sharing and proactive cryptosystems," In ACM Conference on Computer and Communications Security, pp. 86-97, 2002.
Yvo Desmedt and Sushil Jajodia, "Redistributing secret shares to new access structures and its applications," Jul. 1997. Technical Report ISSE TR-97-01, George Mason University, pp. 1-14.
Ivan Damgard and Jesper Buus Nielsen, "Scalable and unconditionally secure multiparty computation." In CRYPTO, pp. 572-590, 2007.
Matthew K. Franklin and Moti Yung, "Communication complexity of secure computation (extended abstract)." In STOC, pp. 699-710, 1992.
Amir Herzberg, Stanislaw Jarecki, Hugo Krawczyk, and Moti Yung, "Proactive secret sharing or: How to cope with perpetual leakage." In CRYPTO, pp. 339-352, 1995.
Torben P. Pedersen, "Non-interactive and information-theoretic secure variable secret sharing." In Joan Feigenbaum, editor, CRYPTO, vol. 576 of Lecture Notes in Computer Scienoe, pp. 129-140, Springer, 1991.
David Schultz, "Mobile Proactive Secret Sharing," PhD thesis, Massachusetts Institute of Technology, 2007, pp. 1-157.
Adi Shamir, "How to share a secret." Commun. ACM, 22(11): pp. 612-613, 1979.
Theodore M. Wong, Chenxi Wang, and Jeannette M. Wing, "Veriable secret redistribution for archive system," In IEEE Security in Storage Workshop, pp. 94-106, 2002.
Lidong Zhou, Fred B. Schneider, and Robbert van Renesse, "Apss: proactive secret sharing in asynchronous systems." ACM Trans. Inf. Syst. Secur., 8(3): pp. 259-286, 2005.
Office Action 1 for U.S. Appl. No. 14/449,115, Date mailed: Jul. 23, 2015.
Office Action 1 Response for U.S. Appl. No. 14/449,115, Date mailed. Oct. 23, 2015.
Office Action 2 for U.S. Appl. No. 14/449,115, Date mailed: Nov. 5, 2015.
Office Action 2 Response for U.S. Appl. No. 14/449,115, Date mailed: Feb. 5, 2016.
Office Action 3 for U.S. Appl. No. 14/449,115, Date mailed: Mar. 7, 2016.
Office Action 1 for U.S. Appl. No. 14/207,321, Date mailed: May 18, 2015.
Office Action 1 Response for U.S. Appl. No. 14/207,321, Date mailed: Aug. 18, 2015.
Office Action 2 for U.S. Appl. No. 14/207,321, Date mailed: Dec. 14, 2015.
Office Action 2 Response for U.S. Appl. No. 14/207,321, Date mailed, Apr. 14, 2016.
Alfred V. Aho, John E. Hopcroft, and J. D. Ullman, The Design and Analysis of Computer Algorithms. Addison-Wesley, pp. 299-300, 1974.
Vaclav E. Benes, Optimal rearrangeable multistage connecting networks. The Bell System Technical Journal, 43(4):1641-1656, Jul. 1964.
Elwyn R. Berlekamp, Algebraic Coding Theory, Aegean Park Press, 1984, Chapter 7.
Michael Ben-Or, Shafi Goldwasser, and Avi Wigderson, Completeness theorems for non-cryptographic fault-tolerant distributed computation (extended abstract). In STOC, pp. 1-10, 1988.
Gabriel Bracha. An O(log n) expected rounds randomized byzantine generals protocol. J. ACM, 34(4)910-920, 1987.
Eli Ben-Sasson, Serge Fehr, and Rafail Ostrovsky, Near-linear unconditionally-secure multiparty computation with a dishonest minority, Cryptology ePrint Archive, Report 2011/629, 2011.
Zuzana Beerliova-Trubiniova and Martin Hirt, Efficient multi-party computation with dispute control. In TCC, pp. 305-328, 2006.
Zuzana Beerliova-Trubiniova and Martin Hirt, Perfectly-secure mpc with linear communication complexity. InTCC, pp. 213-230, 2008.
Ivan Damgard, Yuval Ishai, Mikkel Kroigaard, Jesper Buus Nielsen, and Adam Smith, Scalable multiparty computation with nearly optimal work and resilience. In CRYPTO, pp. 241-261, 2008.
Ivan Damgard, Yuval Ishai, and Mikkel Kroigaard, Perfectly secure multiparty computation and the computational overhead of cryptography. In EUROCRYPT, pp. 445-465, 2010.
Ivan Damgard and Jesper Buus Nielsen. Scalable and unconditionally secure multiparty computation. In CRYPTO, pp. 572-590, 2007.
Michael J. Fischer and Nancy A. Lynch, A lower bound for the time to assure interactive consistency. Inf. Process. Lett., 14(4):183-186, 1982.
Matthew K. Franklin and Moti Yung, Communication complexity of secure computation (extended abstact). In STOC, pp. 699-710, 1992.
Shuhong Gao, A new algorithm for decoding reed-solomon codes. In Communications, Information and Network Security, Editors V.Bhargava, H.V.Poor, V.Tarokh, and S.Yoon, pp. 55-68. Kluwer, 2002.
Craig Gentry, Shai Halevi, and Nigel P. Smart, Fully homomorphic encryption with polylog overhead. In EURO-CRYPT, pp. 465-482, 2012.
Juan A. Garay and Yoram Moses, Fully polynomial byzantine agreement in t+1 rounds. In STOC. pp. 31-41, 1993.
Frank Thomson Leighton, Introduction to parallel algorithms and architectures: arrays, trees, hypercubes. Morgan Kaufmann, 1992, section 3,2.
Rafail Ostrovsky and Moti Yung, How to withstand mobile virus attacks (extended abstract). In PODC, pp. 51-59, 1991.
Abraham Waksman, A permutation network. J. ACM, 15(1):159-163, 1968.
Christian Cachin, Klaus Kursawe, Anna Lysyanskaya, and Reto Strobl, Asynchronous verifiable secret sharing and proactive cryptosystems. In ACM Conference on Computer and Communications Security, pp. 88-97, 2002.
Yvo Desmedt and Sushil Jajodia, Redistributing secret shares to new access structures and its applicatons. Jul. 1997. Technical Report ISSE TR-97-01, George Mason University.
Oded Goldreich, Foundations of Cryptography: vol. 2, Basic Applications. Cambridge University Press, Chapter 7, 2009.
Amir Herzberg, Stanislaw Jarecki, Hugo Krawczyk, and Moti Yung, Proactive secret sharing or: How to cope with perpetual leakage. In CRYPTO, pp. 339-352, 1995.
David Schultz, Mobile Proactive Secret Sharing. PhD thesis, Massachusetts Institute of Technology, 2007.

(56) References Cited

OTHER PUBLICATIONS

Theodore M. Wong, Chenxi Wang, and Jeannette M. Wing, Verifiable secret redistribution for archive system. In IEEE Security in Storage Workshop, pp. 94-106, 2002.
Lidong Zhou, Fred B. Schneider, and Robbert van Renesse, Apss: proactive secret sharing in asynchronous systems. ACM Trans. Inf. Syst. Secur., 8(3)259-286, 2005.
Torben P. Pedersen, Non-interactive and information-theoretic secure verifiable secret sharing. In Joan Feigenbaum, editor, CRYPTO, vol. 576 of Lecture Notes in Computer Science, pp. 129-140. Springer, 1991.
Adi Shamir, How to share a secret. Commun. ACM, 22(11):612-613, 1979.
Office Action 1 for U.S. Appl. No. 14/449,868 Date mailed: Aug. 13, 2015.
Bai, Li, and XuKai Zou, "A proactive secret scheme in matrix projection method," International Journal of Security and Networks 4.4 (2009), pp. 201-209.
Harn, Lein, and Changlu Lin, "Strong (n, t, n) verifiable secret sharing scheme," Information Sciences 180.16 (2010), pp. 3059-3064.
Office Action 1 Response for U.S. Appl. No. 14/449,868 Date mailed: Dec. 10, 2015.
Office Action 2 for U.S. Appl. No. 14/449,868, Date mailed Jan. 29, 2016.
Office Action 1 for U.S. Appl. No. 14/207,483, Date mailed: May 22, 2015.
Office Action 1 Response for U.S. Appl. No. 14/207,483, Date mailed: Sep. 22, 2015.
Office Action 2 for U.S. Appl. No. 14/207,483, Date mailed: Nov. 2, 2015.
Office Action 2 Response for U.S. Appl. No. 14/207,483, Date mailed: Apr. 4, 2016.
Notice of Allowance for U.S. Appl. No. 14/207,321, Date mailed: May 4, 2016.
Office Action 3 for U.S. Appl. No. 14/207,483, Date mailed: May 2, 2016.
Response to Office Action 3 for U.S. Appl. No. 14/207,483, Date mailed Sep. 1, 2016.
Damgard, Ivan, and Jesper Buus Nielsen. "Scalable and unconditionally secure multiparty computation." Advances in Cryptology-CRYPTO 2007. Springer Berlin Heidelberg, 2007, pp. 572-590.
Response to Office Action 3 for U.S. Appl. No. 14/449,115, Date mailed Jun. 7, 2016.
Office Action 4 for U.S. Appl. No. 14/449,115, Date mailed: Jun. 24, 2016.
Office Action 2 for U.S. Appl. No. 14/449,868, Date mailed: Apr. 29, 2016.
Notice of Allowance for U.S. Appl. No. 14/449,868, Date mailed: May 25, 2016.
Corrected Notice of Allowance for U.S. Appl. No. 14/449,868, Date mailed: Aug. 5, 2016.

* cited by examiner

US 9,614,676 B1

CRYPTOGRAPHICALLY-SECURE PACKED PROACTIVE SECRET SHARING (PPSS) PROTOCOL

CROSS-REFERENCE TO RELATED APPLICATIONS

This is a Continuation-in-Part application of U.S. Non-Provisional application Ser. No. 14/449,868, filed on Aug. 1, 2014, entitled, "An Information Secure Proactive Multiparty Computation (PMPC) Protocol with Linear Bandwidth Complexity." U.S. Non-Provisional application Ser. No. 14/449,868 is a Continuation-in-Part application of U.S. Non-Provisional application Ser. No. 14/207,483, filed in the United States on Mar. 12, 2014, entitled, "System and Method for Mobile Proactive Secure Multi-Party Computation (MPMPC) Using Commitments," which is a Non-Provisional patent application of U.S. Provisional Application No. 61/780,757, filed in the United States on Mar. 13, 2013, entitled, "An Efficient Protocol for Mobile Proactive Secure Multiparty Computation (MPMPC) Using Commitments." U.S. Non-Provisional application Ser. No. 14/449,868 is ALSO a Non-Provisional patent application of U.S. Provisional Application No. 61/861,334, filed in the United States on Aug. 1, 2013, entitled, "An Information Theoretically Secure Proactive Multiparty Computation (PMPC) Protocol with Linear Bandwidth Complexity." U.S. Non-Provisional application Ser. No. 14/449,868 is ALSO a Non-Provisional patent application of U.S. Provisional Application No. 61/861,325, filed in the United States on Aug. 1, 2013, entitled, "An Information Theoretically Secure Protocol for Mobile Proactive Secret Sharing; with Near-Optimal Resilience."

This is ALSO a Continuation-in-Part application of U.S. Non-Provisional application Ser. No. 14/449,115, filed in the United States on Jul. 31, 2014, entitled, "An Information Secure Protocol for Mobile Proactive Secret Sharing with Near-Optimal Resilience." U.S. Non-Provisional application Ser. No. 14/449,115 is a Continuation-in-Part application of U.S. Non-Provisional application Ser. No. 14/207,321, filed in the United States on Mar. 12, 2014, entitled, "System and Method for Mobile Proactive Secret Sharing," which is a Non-Provisional patent application of U.S. Provisional Application No. 61/780,638, filed in the United States on Mar. 13, 2013, entitled, "An Efficient Protocol for Mobile Proactive Secret Sharing." U.S. Non-Provisional application Ser. No. 14/449,115 is ALSO a Non-Provisional patent application of U.S. Provisional Application No. 61/861,325, filed in the United States on Aug. 1, 2013. entitled, "An Information Theoretically Secure Protocol for Mobile Proactive Secret Sharing with Near-Optimal Resilience."

This is ALSO a Continuation-in-Part Application of U.S. Non-Provisional application Ser. No. 14/207,321, filed in the United States on Mar. 12, 2014, entitled, "System and Method for Mobile Proactive Secret Sharing," which is a Non-Provisional patent application of U.S Provisional Application No. 61/780,638, filed Mar. 13, 2013, entitled, "An Efficient Protocol for Mobile Proactive Secret Sharing."

This is ALSO a Non-Provisional patent application of U.S. Provisional Application No. 62/032,295, filed in the United States on Aug. 1, 2014, entitled, "A Cryptographically-Secret Packed Proactive Secret Sharing (PPSS) Protocol."

FIELD OF INVENTION

The present invention relates to a cryptographic security system and, more particularly, to a cryptographic security system for securely storing data distributed among a group of computing devices.

BACKGROUND OF THE INVENTION

Proactive Secret Sharing (PSS) allows secret data to be securely distributed among a group of computing devices (also referred to as players or parties in multiparty computation (MPC) literature) in such a way that if an adversary compromises no more than a fixed fraction of the computing devices, the adversary will not gain any information about the data and cannot cause data corruption.

There are several published PSS schemes (see the List of Incorporated Cited Literature Reference Nos. 1, 2, 6, 8, 10, and 11 for a description of the PSS schemes). Out of the published PSS protocols that are secure against active adversaries, the best communication complexity is $O(n^3)$ per secret (where n is the number of computing devices).

Thus, a continuing need exists for a PSS protocol that improves computational complexity.

SUMMARY OF THE INVENTION

The present invention relates to a cryptographic security system and, more particularly, to a cryptographic security system for securely storing data that may be distributed among a group of computing devices. In some embodiments, the system comprises one or more processors and a memory having instructions such that when the instructions are executed, the one or more processors perform multiple operations. The system uses a Secret-Share protocol to distribute, by computing device $P_D$, a block of secret data comprising a plurality of shares of secret data among a set of computing devices, wherein each computing device in the set of computing devices holds an initial share of secret data. The system uses at least one Secret-Redistribute protocol to periodically redistribute the plurality of shares of secret data among the set of computing devices, wherein each computing device in the set of computing devices holds a subsequent share of secret data from the block of secret data that is independent of the initial share of secret data.

In another aspect, the system may use a Secret-Open protocol to reveal the block of secret data.

In another aspect, the operations have a communication complexity of $O(Wn+n^2)$, where W is the total number of secret field elements, and n is the number of computing devices.

In another aspect, the system uses a GenPoly protocol to cause the computing devices in the set of computing devices to create L random polynomials of degree D with Pedersen commitments in parallel.

In another aspect, the system uses the Secret-Share protocol further by:
  distributing a share of secret data as follows:
    i. picking, by computing device $P_D$, a random degree polynomial;
    ii. computing, with computing device $P_D$, Pedersen commitments and broadcasting Pedersen commitments and encrypted shares of secret data;
  detecting an error as follows:
    i. for each computing device that receives the share of secret data, decrypting the message and verifying that the Pedersen commitments correspond to the received shares of secret data;

ii. for any computing device that detects that the Pedersen commitments do not correspond to the received shares of secret data, said computing device being an accusing computing device and broadcasting an accusation amongst the set of computing devices that a sending computing device is corrupt;

iii. broadcasting, by the sending computing device, a defense to rebut the accusation;

iv. for each computing device, determining if the defense is accurate, such that if the accusation is not correctly rebutted, computing device $P_D$ is added to a list of known corrupted computing devices Corr, and if the accusation is correctly rebutted, then the accusing computing device is added to Corr, with the protocol terminating if computing device $P_D$ is not found to be corrupt.

In another aspect, the system uses the GenPoly protocol by:

distributing as follows:
i. for each computing device that is not in the list of known corrupted computing devices Corr, generating random polynomials;
ii. for each said computing device that generates random polynomials that is not in Corr, computing Pedersen commitments, with each computing device then broadcasting the Pedersen commitments and encrypted shares of secret data,
iii. adding to Corr each computing device that did not broadcast Pedersen commitments;

detecting error(s) as follows:
i. for each computing device $P_i$ that is not in Corr, determining that each pair of shares of secret data received above corresponds to the Pedersen commitments;
ii. for any computing device $P_i$ that detects that the Pedersen commitments do not correspond to the received pair of shares of secret data, said computing device being an accusing computing device and broadcasting an accusation amongst the set of computing devices that a sending computing device is corrupt;
iii. if a computing device is accused, the accused computing device broadcasting a rebuttal defense that includes the correct pair of shares of secret data along with a randomness key that was used to encrypt a pair of values;
iv. for each computing device, determining if the defense is accurate, such that if the accusation is not correctly rebutted, the accused computing device is added to a list of known corrupted computing devices Corr, and if the accusation is correctly rebutted, then the accusing computing device is added to Corr; and
v. for each computing device, computing its share of an output polynomial.

In another aspect, the system uses the Secret-Redistribute protocol by:

performing the GenPoly protocol in parallel to generate random polynomials;
transferring Pedersen commitments as follows:
i. for each computing device $P_i$ that is not in Corr, broadcasting Pedersen commitments for an old secret sharing polynomial for computing devices in a new group;
ii. for each computing device $P_j$, determining correct values for the Pedersen commitments broadcast in the previous step by a set of Pedersen commitments that are broadcast by a majority of the computing devices;

transferring shares and interpolating as follows:
i. for each computing device $P_i$, computing shares of masked secret-sharing polynomials and broadcasting the encrypted shares of secret data;
ii. for each computing device $P_j$, verifying that the encrypted shares of secret data broadcast above are correct given known Pedersen commitments;
iii. for each computing device $P_j$, using all encrypted shares of secret data that are determined to be correct to interpolate new shares of secret data; and for each computing device $P_i$ in the set of computing devices, erasing all of its data.

In another aspect, the system uses the Secret-Open protocol by:

for each computing device $P_i$, broadcasting its shares its signature for the shares of secret data;

for each computing device $P_i$, verifying for each pair of points that correspond to the broadcast shares of secret data, that the shares of secret data correspond to the Pedersen commitments; and for each computing device $P_i$, for all the points in which the shares of secret data correspond to the Pedersen Commitments, interpolating the secret.

In another aspect, the present invention comprises a method for causing a processor to perform the operations described herein.

Finally, in yet another aspect, the present invention comprises a computer program product comprising, computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of various aspects of the invention in conjunction with reference to the following drawings, where.

DETAILED DESCRIPTION

Figure 1:
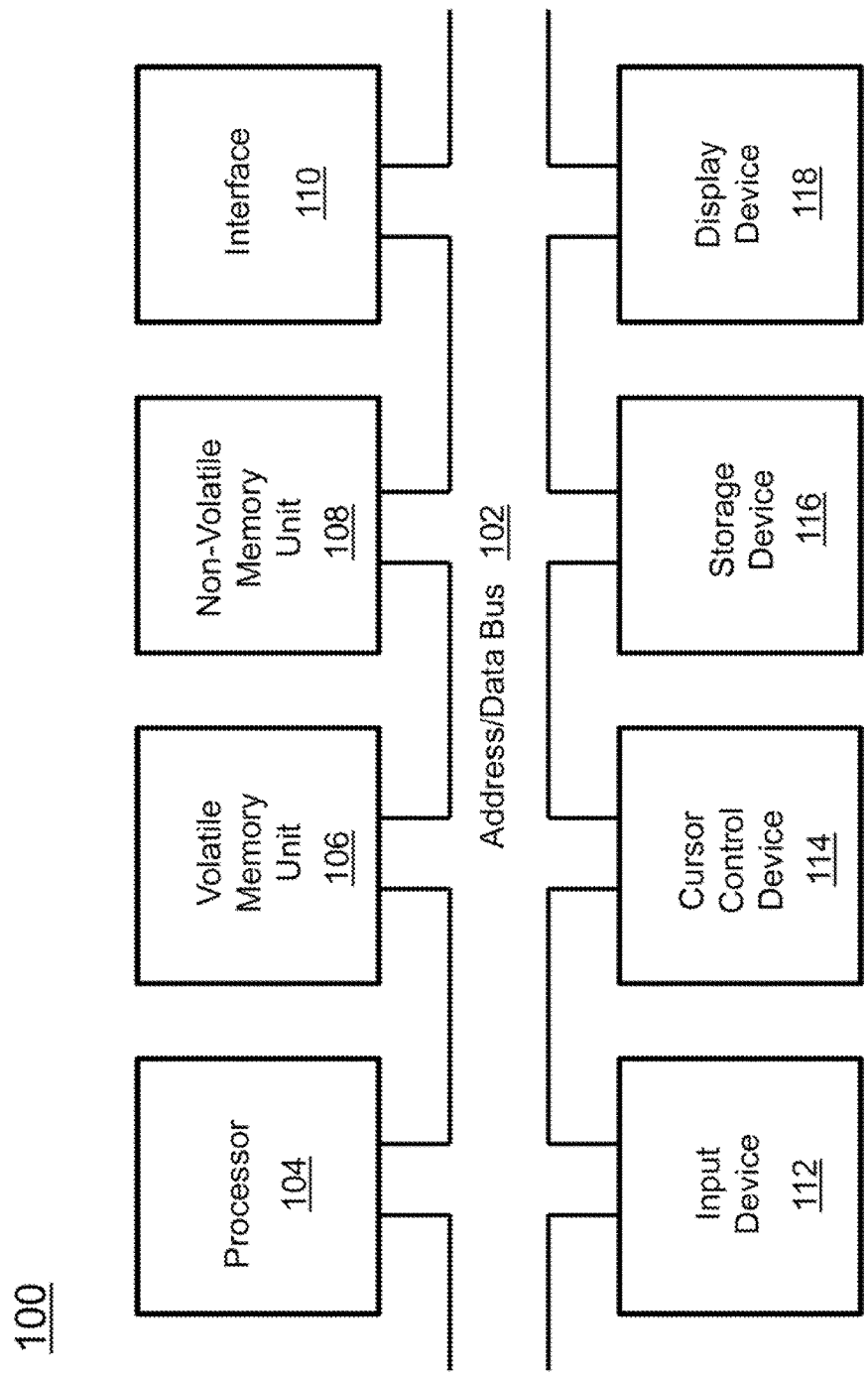
FIG. 1 is a block diagram depicting the components of a system for proactive secret sharing according to some embodiments.

The present invention relates to a security system and, more particularly, to a security system that employs a secure proactive multiparty computation protocol. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of various embodiments. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of various embodiments is provided. Following that is an introduction that provides an overview of various embodiments. Finally, specific details of various embodiments are provided to give an understanding of the specific aspects.

(1) List of Incorporated Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows.

1. Christian Cachin, Klaus Kursawe, Anna Lysyanskaya, and Reto Strobl. Asynchronous verifiable secret sharing and proactive cryptosystems. In ACM Conference on Computer and Communications Security, pages 88-97, 2002.
2. Yvo Desmedt and Sushil Jajodia. Redistributing secret shares to new access structures and its applications. Technical Report ISSE TR-97-01, George Mason University, July 1997.
3. Ivan Damgard and Jesper Buus Nielsen. Scalable and unconditionally secure multiparty computation, In CRYPTO, pages 572-590, 2007.
4. Matthew K. Franklin and Moti Yung. Communication complexity of secure computation (extended abstract). In STOC, pages 699-710, 1992.
5. Oded Goldreich. Foundations of Cryptography: Volume 2, Basic Applications, Chapter 7. Cambridge University Press, 2009.
6. Amir Herzberg, Stanislaw Jarecki, Hugo Krawczyk, and Moti Yung. Proactive secret sharing or: How to cope with perpetual leakage. In CRYTPO, pages 339-352, 1995.
7. Torben P. Pedersen. Non-interactive and information-theoretic secure verifiable secret sharing. In Joan Feigenbaum, editor, CRYPTO, volume 576 of Lecture Notes in Computer Science, pages 129-140. Springer, 1991.
8. David Schultz. Mobile proactive secret sharing. PhD thesis, Massachusetts Institute of Technology, 2007.
9. Adi Shamir. How to share a secret. Commun. ACM, 22(11): 612-613, 1979.
10. Theodore M. Wong, Chenxi Wang, and Jeannette M. Wing. Verifiable secret redistribution for archive system. In IEEE Security in Storage Workshop, pages 94-106, 2002.
11. Lidong Zhou, Fred B. Schneider, and Robbert van Renesse. Apss: proactive secret sharing in asynchronous systems. ACM Trans. Inf. Syst. Secur., 8(3):259-286, 2005.

(2) Principal Aspects

The present invention has three "principal" aspects. The first is a cryptographically-secure packed proactive secret sharing (PPSS) protocol. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys.

Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
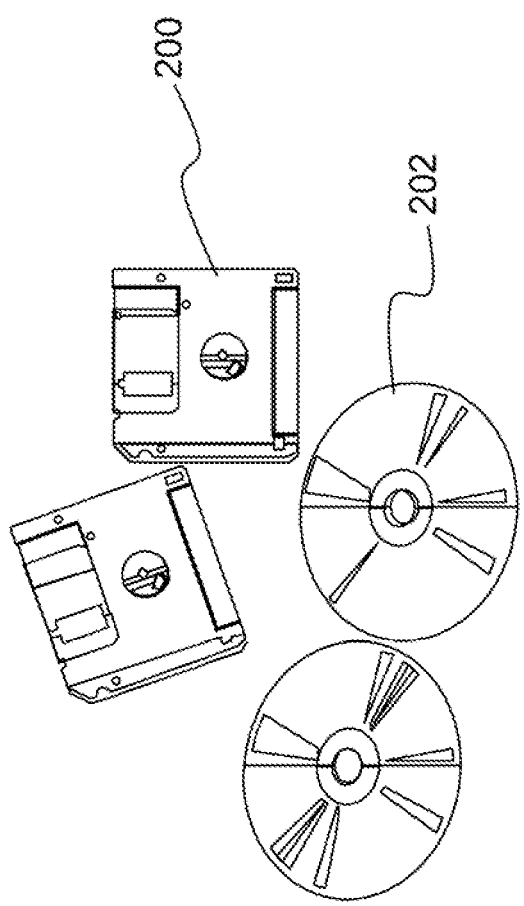
FIG. 2 is an illustration of a computer program product according to some embodiments.

An illustrative diagram of a computer program product (i.e., storage device) embodying an aspect of the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e, computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

Proactive Secret Sharing; (PSS) allows secret data to be securely distributed among a group of computing devices (also referred to as players or parties in multiparty computation (MPC) literature) in such a way that if an adversary compromises no more than a fixed fraction of the computing devices, the adversary will not gain any information about the data and cannot cause data corruption. This remains true even if the adversary is allowed to eventually compromise all of the computing devices, so long as no more than a fixed fraction are compromised during any given stage of the operation of the PSS protocol. Cryptographic security means that the probability of an adversary being able to compromise the security of the computation is negligibly low, and that the protocol is only secure under the assumption that a certain mathematical problem is infeasible for the adversary to solve. Non-limiting examples of computing devices include a server, a mobile device, a drone having a processor, a virtual computing device, and a virtual server.

The system according to some embodiments can be used to securely store data distributed amount a group of computing devices in such a way that if a malicious party captures a (limited) fraction of the data by compromising the computing devices holding it, then this data will "expire" after a given time. Any "expired" data gives the malicious party no information about the secret stored data.

(4) Specific Details of the Invention (4.1) PPSS Protocol Overview

Figure 3:
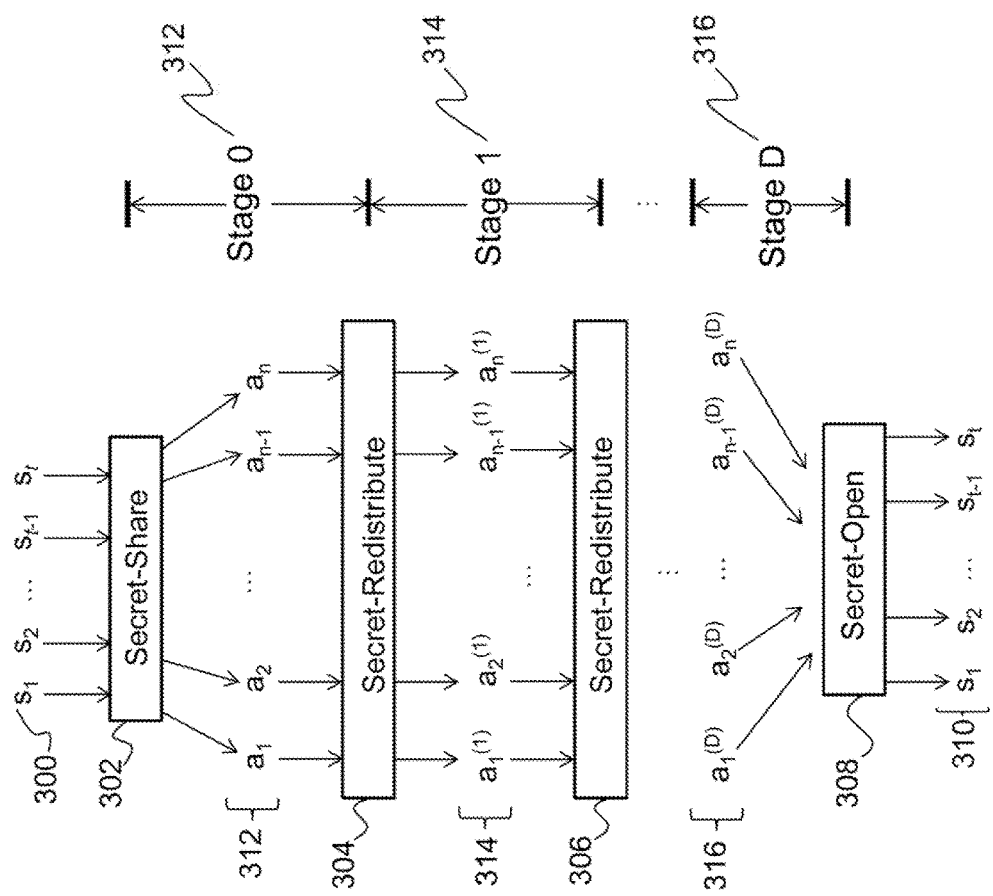
FIG. 3 illustrates an overview of PPSS implementation according to some embodiments.

Described below is an overview of the packed proactive secret sharing (PPSS) protocol according to some embodiments. As depicted in FIG. 3, the data to be stored is arranged in blocks of a specific size (as defined below). A block of secret data (e.g., $s_1$ through $s_l$, 300) is distributed among a group of computing devices using a Secret-Share protocol 302. Each computing device holds one share of data encoding the block of secrets. For instance, computing device $P_i$'s share during a stage k is $\alpha_i^{(k)}$. Some of the computing devices may be corrupted by a malicious party, called an adversary. Even though in practice there may be more than one malicious party corrupting players, it can be assumed without loss of generality that there is one malicious party. To protect against the adversary, the computing devices periodically "refresh" their shares so that each computing device holds a new share of the same block of data that is independent of the previous share. The refreshing is implemented using a Secret-Redistribute protocol, which is described in detail below. As shown in FIG. 3, the protocol may include a first invocation of a Secret-Redistribute protocol 304 and a second invocation of a Secret-Redistribute protocol 306 (or additional consecutive invocations of Secret-Redistribute protocols). The computing devices may simply store their shares of the data ($a_i$), or they may perform some linear operations on their shares. Once the data needs to be accessed, the computing devices run a Secret-Open protocol 308 to reveal a set of secret data 310. Elements 312, 314, and 316 represent the shares of the computing devices at stages 0, 1, and D, respectively.

(4.2) Technical Preliminaries

Consider a set of computing devices $\mathcal{P}$ which are to store data represented in some finite field $\mathbb{F}$ (defined below). The shares of the data will be redistributed periodically. The period between consecutive redistributions (e.g., between the first Secret-Redistribute protocol 304 and the second Secret-Redistribute protocol 306) is called a stage (e.g., stage 0 represented by element 312, stage 1 represented by element 314, stage D represented by element 316). Also, the period before the first redistribution is a stage (i.e., stage 0 represented by element 312), and the period after the last redistribution is a stage (i.e., stage D represented by element 316). Stages are defined such that the redistribution itself is considered to be in both the stage before and after redistribution. Referring to FIG. 3, the first redistribution is in both stages 0 (element 312) and 1 (element 314).

Let n denote the number of parties and write $$\mathcal{P} = \{P_i\}_{i=1}^n.$$

Let t denote the threshold of corruption (i.e., the maximum number of parties the adversary may corrupt during any given stage). The adversary may corrupt and de-corrupt parties at will, so long as the number of distinct corrupt computing devices per stage does not exceed the threshold. Any party that is corrupt during secret redistribution (i.e., the Secret-Redistribute protocol, elements 304 and 306) is considered to be corrupt in both adjacent stages. It is required that $$t \leq \left(\frac{1}{2} - \epsilon\right)n$$

at each stage for some fixed constant $$0 < \epsilon < \frac{1}{2}.$$

This constant (e.g., $\epsilon = 1/10$) can be determined by the end user. Let Corr denote the set of parties that are known by everyone to be corrupt; it is assumed initially that Corr=ø.

A synchronous network model with a secure, authenticated broadcast channel is assumed. These terms are defined in, for instance, Literature Reference No. 5. The proactive secret sharing schemes used in Literature Reference No. 6 and 8 are based on Shamir's secret sharing secret (described in Literature Reference No. 9), in which the shares of a secret are points on a polynomial, the constant term of the polynomial being the secret.

Denote by d the degree of the polynomial used to distribute the secrets, and by e the number of secrets stored in each polynomial. So knowing any d+1 points on the polynomial allows one to interpolate the polynomial (and, hence, all of the secrets), but knowing d−l+1 or fewer points does not reveal any information about the secrets. Since there are at most t corrupt parties, d≥l+t−1 is needed in order to keep the corrupt parties from finding out any information about the secrets, and d=l+t−1 is set. In order to make sure the honest (non-corrupt) parties can interpolate the polynomial, n−t≥d+1=l+t is needed. So $$l \leq n - 2t = n - 2\left(\frac{1}{2} - \epsilon\right)n = 2\epsilon n,$$

and $$l = \lfloor 2\epsilon n \rfloor$$

is set.

To that end, let p be a large prime number (e.g., p may have a bit length of at least 2048), and let q be a prime such that p=mq+1 for some small integer m. It is required that q>2n and that q be greater than the logarithm of the security parameter. The security parameter is a variable which determines the likelihood of compromising the system, and this parameter (e.g., 30) may be determined by the end user. The secrets will be elements $\mathbb{F} = \mathbb{Z}_q$. Let G be the cyclic group of order p and let g∈G be an element of order q. Furthermore, let h∈⟨g⟩ such that no party knows $\log_g h$. Let $\alpha$ be a generator of $\mathbb{Z}_q$, and let $\beta = \alpha^{-1}$. To share a block of secrets $s_1, \ldots, s_l$ with polynomial $$u \in \mathbb{Z}_q[x]$$

of degree d, the polynomial is constructed so that $u(\beta^i) = s_i$ for each i=1, ..., l. Each party $P_i$ receives as its share of the block of secrets the point $u(\alpha^i)$ on the polynomial.

For each secret-storing polynomial, there will be a corresponding auxiliary polynomial $$v \in \mathbb{Z}_q[x],$$

also of degree d. Each party $P_i$ is sent $v(\alpha^i)$ along with $u(\alpha^i)$. Let $u_k$ denote the coefficient of $x^k$ in u(x) (and similarly for $v_k$). Then, when the secret is shared, the values $g^{u_k} h^{v_k}$ are broadcast for each k; these values are the Pedersen commitments (see Literature Reference No. 7 for a description of Pederson commitments) used to verify accuracy of transmitted shares. This means that $g^{u(\alpha^i)}h^{v(\alpha^i)}$ is also public knowledge for each i (as it can be computed from the $g^{u_k}h^{v_k}$. This allows parties to verify that the shares they received are consistent with the commitments broadcast by the dealer by checking that $$g^{u(\alpha^i)}h^{v(\alpha^i)} = \prod_{k=0}^{d}(g^{u_k}h^{v_k})^{(\alpha^i)^k}.$$

Assuming the discrete logarithm problem is computationally infeasible, this provides a perfectly private and computationally binding verifiable secret sharing scheme.

It is assumed that each party has a public key encryption scheme, and the encryption of MESSAGE for party $P_i$ is denoted as $ENC_{P_i}$ (MESSAGE). Each party also has a signature scheme, and $P_i$'s signature for MESSAGE is denoted as $SIG_{P_i}$ (MESSAGE). The protocol requires that if an adversary corrupts a party, it does not learn that party's secret key. This could be implemented using a Trusted Platform Module (TPM) that perffirms encryption and generates signatures without revealing the secret keys. RAND is used to denote a random field element. Below is a table of symbols used in the protocol description.

| | Table of Symbols |
|---|---|
| $\mathcal{P}$ | The set of computing devices engaged in the protocol in the current stage. |
| n | The number of computing devices engaged in the protocol in the current stage. |
| t | The maximum number of computing devices that a malicious party can corrupt without revealing the secret. This is called the threshold of corruption. |
| d | The degree of the polynomials used to share the secrets. |
| Corr | A publicly known set of computing devices which are possibly corrupt. |
| $P_i$ | The computing device with index i in $\mathcal{P}$. |
| $\alpha^i$ | The evaluation point of computing device $P_i$. This determines which share of the secret $P_i$ will get. |
| $\beta^j$ | The evaluation point of the $j^{th}$ secret in the block of secret data. |

(4.3) Secret Sharing, Redistribution, and Opening (4.3.1) Secret Sharing

The following protocol allows a dealer, $P_D$, to share a block of secrets $s_1, \ldots, s_l$ using Pedersen commitments as described above.

(4.3.1.1) Secret Share (t, $P_D$, ($s_1, \ldots, s^l$), $\mathcal{P}$, Corr)

1. Share/Commitment Distribution 1.1 $P_D$ picks a random polynomial $\tilde{u}(x)$ of degree d−l and sets $$u(x) = \left(\sum_{j=1}^{l} s_j \prod_{1 \leq i \leq l, i \neq j}\left[\frac{x-\beta^i}{\beta^j-\beta^i}\right]\right) + \tilde{u}(x)\prod_{i=1}^{l}(x-\beta^i),$$

denoting the coefficients of u by $u(x)=u_0+u_1 x+\ldots+u_d x^d$. This results in a polynomial u of degree d that is random subject to the constraint that $u(\beta^i)=s_i$ for each $i=1, \ldots, l$. $P_D$ also picks a random degree d polynomial $v(x)=v_0+v_1 x+\ldots v_d x^d$.

1.2 $P_D$ computes $\epsilon_k = g^{u_k}h^{v_k}$ for each $k=0, \ldots, d$ and broadcasts $$VSS_{P_D} = (D, \{ENC_{P_i}[u(\alpha^i), v(\alpha^i)]\}_{i=1}^{n}, \{\epsilon_k\}_{k=0}^{d})$$

and $SIG_{P_D}(VSS_{P_D})$.

1.3 Each party that did not produce a properly signed message in the previous step is added to Corr (This step when executed in parallel; otherwise, this step applies only to $P_D$).

2. Error Detection 2.1 Each $P_i \notin$ Corr decrypts the message sent by $P_D$ to find $u(\alpha^i), v(\alpha^i)$ and verifies that $$g^{u(\alpha^i)}h^{v(\alpha^i)} = \prod_{k=0}^{d}(\epsilon_k)^{(\alpha^i)^k}.$$

2.2 Any $P_i \notin$ Corr who detected a fault in step 2.1 broadcasts $ACC_{P_i}=$(i, accuse, D, RAND) and $SIG_{P_i}(ACC_{P_i})$.

2.3 For each properly signed accusation (from party $P_i$) made in step 2.2, $P_D$ broadcasts (D, defense, i, [$u(\alpha^i)$, $v(\alpha^i)$], $RAND_i$), where $RAND_i$ is the randomness that was used to encrypt the message for $P_i$ in step 1.2.

2.4 Each party checks to see if the defenses broadcast in step 2.3 are correct (i.e., the defense was well-formed, the pair encrypts to the same message broadcast in step 1.2 when the given randomness is used, and the pair passes the check in step 2.1). For each accusation that was rebutted with a correct defense, the accuser is added to Corr. If any accusation was not correctly rebutted, $P_D$ is added to Corr. If $P_D$ is not found to be corrupt, then the protocol terminates successfully.

The communication complexity of the Secret-Share protocol is O(n) field elements. It takes three rounds of communication. Multiple instances of the Secret-Share protocol can be run in parallel for different blocks of secrets without affecting the round of complexity. The protocol uses $O(n^3)$ multiplications, $O(n^3)$ exponentiations, $O(n^2)$ encryptions, and O(n) signatures.

(4.3.2) Generating Random Polynomials

Let V be a Vandermonde matrix with n rows and n-t columns, and let $M=V^T$. It was shown in Literature Reference No. 3 that if x is an n-dimensional vector and n-t of its coordinates have a uniformly random distribution, and the other t coordinates are independent of those n-t coordinates, then all of the coordinates of Mx have a uniformly random distribution. It is assumed there is a fixed, publicly known M.

Described below is a protocol for creating L random polynomials with Pedersen commitments in parallel. The polynomials are generated in batches of size n-t, so if L is not a multiple of n-t, some additional polynomials will be generated. The degree of the generated polynomials is D, which may not equal d.

(4.3.2.1) GenPoly (t, $\mathcal{P}$, Corr, L, D)

1. Proposal Distribution 1.1 Define $L'=\lceil L/(n-t) \rceil$. Each party $P_i \notin$ Corr generates 2L' random polynomials $$\{(Q_i^{(k)}, Y_i^{(k)})\}_{k=1}^{L'},$$

with deg $Q_i^{(k)}$=deg $\gamma_i^{(k)}$=D. Write $Q_i^{(k)}(x)=q_{i,0}^{(k)}+q_{i,1}^{(k)}x+\ldots+q_{i,D}^{(k)}x^D$ (and the coefficients for $\gamma_i^{(k)}$ are similarly $\gamma_{i,j}^{(k)}$).

1.2 Each party $P_i \notin$ Corr computes $\in_{i,j}^{(k)}=g^{q_{i,j}^{(k)}}h^{\gamma_{i,j}^{(k)}}$ for each j=1, ..., D and k=1, ..., L'. Then $P_i$ broadcasts $$VSS_{P_i} = \left(i, \{\{ENC_{P_m}[Q_i^{(k)}(\alpha^m), \gamma_i^{(k)}(\alpha^m)]\}_{m=1}^n, \{\in_{i,j}^{(k)}\}_{j=0}^D\}_{k=1}^{L'}\right)$$

and $SIG_{P_i}(VSS_{P_i})$.

1.3 Each party that did not produce a properly signed message in the previous step is added to Corr.

2. Error Detection 2.1 Each party $P_i \notin$ Corr checks for each pair $$[Q_m^{(k)}(\alpha^j), \gamma_m^{(k)}(\alpha^j)]$$

received in the previous step that $$g^{Q_m^{(k)}(\alpha^j)}h^{\gamma_m^{(k)}(\alpha^j)} = \prod_{j=0}^D (\in_{m,j}^{(k)})^{(\alpha^i)^j}.$$

2.2 If $P_i$ detected a fault in the previous step with the pair $$[Q_m^{(k)}(\alpha^j), \gamma_m^{(k)}(\alpha^j)],$$

it broadcasts $ACC_{P_i}$=(i, accuse, m, k) and $SIG_{P_i}(ACC_{P_i})$. $P_i$ broadcasts an accusation no more than once for each $P_m$, although there may be more than one accusation per k.

2.3 If $P_i$ was accused (with a properly signed accusation) in the previous step, it broadcasts the (purported) pair of values along with the randomness $RAND_{i,m,k}$ that that was used to encrypt it in step 1.2:

$$(i, \text{defense}, m, [Q_i^{(k)}(\alpha^m), \gamma_i^{(k)}(\alpha^m)], RAND_{i,m,k}).$$

2.4 Each party checks to see if the defenses broadcast in step 2.3 are correct (i.e., the defense was well-formed, the pair encrypts to the same message broadcast in step 1.2 when the given randomness is used, and the pair passes the check in step 2.1). For each accusation that was rebutted with a correct defense, the accuser is added to Corr. For each accusation that was not correctly rebutted, the accused party is added to Corr.

3. Local Share Manipulation

For each $P_i \notin$ Corr and each k, $Q_i^{(k)}$ and $\gamma_i^{(k)}$ is defined to be the all-zero polynomial. The parties convert each batch k of n polynomials into a batch of n-t polynomials as follows:

$$(R^{((k-1)(n-t)+1)}, R^{((k-1)(n-t)+2)}, \ldots, R^{(k(n-t))})^T = M(Q_1^{(k)}, Q_2^{(k)}, \ldots, Q_n^{(k)})^T.$$

The parties similarly use the $\gamma^{(k)}$ to construct auxiliary polynomials $\zeta^{(s)}$ for the $R^{(s)}$. Each party locally computes the Pedersen commitments for these polynomials as follows. Denote the coefficient of M in the $a^{th}$ row and $b^{th}$ column by $m_{a,b}$, the commitment $$g^{r_j^{((k-1)(n-t)+s)}}h^{\zeta_j^{((k-1)(n-t)+s)}}$$

for $$R^{((k-1)(n-t)+s)}$$

is $$\prod_{i=1}^n (\in_{i,j}^{(k)})^{m_{s,i}}.$$

The output is the set $$\{(R^{(s)}, \zeta^{(s)})\}_{s=1}^L.$$

The communication complexity of GenPoly is $O(L'n^2)$= $O\_Ln+n^2)$ field elements (assuming that D=O(n)). It takes 3 rounds of communication. The protocol uses $O(Ln^2+n^4)$ multiplications, $O(Ln^2+n^4)$ exponentiations, $O(Ln+n^3)$ encryptions, and $O(Ln+n^2)$ signatures.

(4.3.3) Secret Redistribution

The following protocol allows one to redistribute a block of secrets. Redistribution can be divided into two components renewal and recovery. Renewal means that the polynomial that stores the secrets is re-randomized so that the new shares are independent of the old shares (except for the fact that they store the same block of secrets). This prevents the adversary from using old shares to gain information about the secrets. Recovery means that parties that were previously corrupted and then de-corrupted or "rebooted" are able to regain their shares, since the adversary may have altered their memory and erased their shares.

(4.3.3.1) Secret-Redistribute $$(t, \mathcal{P}, \text{Corr}, [s_1, \ldots, s_l])$$

It is assumed that the block of secrets $s_1, \ldots, s_l$ have been correctly shared with polynomial u and auxiliary polynomial v (both of degree d) and that the Pedersen commitments for these polynomials are known to all parties in $\mathcal{P}$.

1. Polynomial Generation

Invoke GenPoly (t, P, Corr, 1, d-1) to generate Q of degree d-1 with auxiliary polynomial $\gamma$. In parallel, invoke GenPoly (t, $\mathcal{P}$, Corr, n, d-1) to generate $\{R^{(j)}\}_{j=1}^n$ of degree d-1 with auxiliary polynomials $\{\zeta^{(j)}\}_{j=1}^n$. Denote the $k^{th}$ coefficient of Q by $q_k$, and similarly for $R^{(j)}$, $\gamma$, and $\zeta^{(j)}$.

2. Coefficient Transfer

1. Each $P_i \notin$ Corr broadcasts the commitments for the old secret sharing polynomial (i.e., $COM_{P_i}=\{g^{u_k}h^{v_k}\}_{k=1}^d$ and $SIG_{P_i}(COM_{P_i})$).

2. Each $P_j$ determines the correct values for the commitments broadcast in the previous step by siding with the majority.

3. Share Transfer and Interpolation
1. Denote $$Z(x) = \prod_{j=1}^{l} (x - \beta^j).$$

Each $P_i$ computes $\theta_{i,j} = u(\alpha^i) + Z(\alpha^i)Q(\alpha^i) + (\alpha^i - \alpha^j)R^{(j)}(\alpha^i)$ and $\phi_{i,j} = v(\alpha^i) + Z(\alpha^i)\gamma(\alpha^i) + (\alpha^i - \alpha^j)\zeta^{(j)}(\alpha^i)$ and broadcasts $$VSS_{P_i} = \left( \{ENC_{P_j}[\theta_{i,j}, \phi_{i,j}]\}_{j=1}^n \right)$$

and $SIG_{P_i}(VSS_{P_i})$. The idea is that for $P_j$, the parties mask u with the polynomial $Z(x)Q(x)+(x-\alpha^j)R^{(j)}(x)$, and similarly for v.

2. Each party that did not produce a properly signed message in the previous step is added to Corr.

3. Each $P_j$ checks whether the values broadcast in step 3.1 are correct given the publicly known Pedersen commitments. That is, $P_j$ checks if $$g^{\theta_{i,j}} h^{\phi_{i,j}} = g^{u(\alpha^i)} h^{v(\alpha^i)} \prod_{k=0}^{d-1} (g^{q_k} h^{\gamma_k})^{z(\alpha^i)(\alpha^i)^k} \left( g^{r_k^{(j)}} h^{\epsilon_k^{(j)}} \right)^{(\alpha^i - \alpha^j)(\alpha^i)^k}$$

4. The new sharing polynomial is defined to be $u'(x)+Z(x)Q(x)$, and similarly the new auxiliary polynomial is $v'(x)=v(x)+Z(x)\gamma(x)$. Since $(x-\alpha^j)R^{(j)}(x)$ evaluates to zero at $x=\alpha^j$, $P_j$ can deduce $u'(\alpha^j)$ from the points on $u'(x)+(x-\alpha^j)R^{(j)}(x)$ that were sent to him (and similarly for $v'(\alpha^j)$). So each $P_j$ uses all the shares that passed the check in step 3.3 to interpolate his new share $u'(\alpha^j)$, as well as $v'(\alpha^j)$.

5. The players compute the commitments for the new polynomial, which are $g^{u_k} h^{v_k} (g^{q_k} h^{\gamma_k})^{Z(\alpha^j)(\alpha^j)^k}$ for each $k=1, \ldots, d$.

4. Data Erasure

1. Each $P_i$ erases all their data associated with u and v, keeping the data associated with u' and v'. Set Corr=ø.

This protocol is such that $v(\beta^j)=v'(\beta^j)$ for each $j=1, \ldots, l$, which implies $g^{u(\beta^j)} h^{v(\beta^j)} = g^{u'(\beta^j)} h^{v'(\beta^j)}$. This does note create a security concern, because even if only one party were corrupt, the adversary would know $g^{u(\beta^j)} h^{v(\beta^j)}$ and there is no way to erase data from the adversary's memory.

The communication complexity of Secret-Redistribute is $O(n^2)$ field elements per secret (amortized). It takes 5 rounds of communication. The protocol uses $O(n^4)$ multiplications, $O(n^4)$ exponentiations, $O(n^3)$ encryptions, and $O(n^2)$ signatures.

(4.3.4) Secret Opening

This protocol may reveal a batch of stored secrets to all parties. It can ensure that each honest party reconstructs the correct values.

(4.3.4.1) Secret-Open (t, $\mathcal{P}$, [$s_1, \ldots, s_l$])

It is assumed that the block of secrets $s_1, \ldots, s_l$ have been shared with polynomial u and auxiliary polynomial v (both of degree d). If the $k^{th}$ coefficient of u is $u_k$ (and similarly for $v_k$), then it is assumed that the Pedersen commitments $\in_k = g^{u_k} h^{v_k}$ for each $k=0, \ldots, d$ are publicly known.

1. Each party $P^i$ broadcast his shares $$SH_{P_i} = [u(\alpha^i), v(\alpha^i)] \text{ and } SIG_{P_i}(SH_{P_i}).$$

2. Each party checks for each pair of properly signed points $u(a^j)$, $v(a^j)$ received in the previous step that $$g^{u(\alpha^j)} h^{v(\alpha^j)} = \prod_{k=0}^{d} (\in_k)^{(\alpha^j)^k}.$$

3. Each party uses all the points that passed the check in step 2 to interpolate the secrets $s_i = u(\beta^i)$ for $i=1, \ldots, l$ (see Literature Reference No. 9 for details).

The communication complexity of Secret-Open is O(n) field elements. It takes 1 round of communication. It uses $O(n^3)$ multiplications and $O(n^3)$ exponentiations.

The invention described herein enables the storing of information in a secure, distributed fashion in a hostile environment where the storage platforms may change dynamically over time. For instance, as a non-limiting example, data (such as sensitive security data (e.g., public-key certificates)) can be stored in a distributed fashion across vehicles or in a cloud-based network.

Furthermore, the system according to various embodiments can be used to store data in a distributed fashion across unmanned aerial vehicles (UAVs), soldiers, and other platforms. For example, a group of soldiers can maintain a highly sensitive piece of information (such as encryption keys and identifying information) distributed across cellular phones (or other communication devices) that each soldier possesses.

Additionally, various embodiments can be used to secure cellular phone data. For instance, certain smart phone applications store sensitive information, such as cellular phone data. The invention described herein can secure this data by dynamically spreading it to all cellular phones in the area.

What is claimed is:

1. A system for implementing proactive secret sharing, the system comprising:
one or more processors and a non-transitory computer-readable medium having executable instructions encoded thereon such that when executed, the one or more processors perform operations of:
using a Secret-Share protocol to distribute, by computing device $P_D$, a block of secret data comprising a plurality of shares of secret data among a set of computing devices of a synchronous network, wherein shares of secret data are transmitted electronically via a secure, authenticated broadcast channel, and wherein each computing device in the set of computing devices holds an initial share of secret data;
using at least one Secret-Redistribute protocol to periodically redistribute the plurality of shares of secret data among the set of computing devices, wherein each computing device in the set of computing devices holds a subsequent share of secret data from the block of secret data that is independent of the initial share of secret data;
verifying accuracy of the plurality of shares of secret data using Pedersen commitments, wherein a communication complexity for the Secret-Share protocol is O(n), where n denotes a number of computing devices, and O represents big O notation; and periodically erasing, by each server, the shares of secret data to preserve security against an adversary.

2. The system as set forth in claim 1, herein the one or more processors further perform an operation of using a Secret-Open protocol to reveal the block of secret data.

3. The system as set forth in claim 2, wherein the one or more processors further perform an operation of using a GenPoly protocol to cause the computing devices in the set of computing devices to create L random polynomials of degree D with Pedersen commitments in parallel.

4. The system as set forth in claim 3, wherein using the Secret-Share protocol further comprises operations of:
  distributing a share of secret data as follows;
    i. picking, by computing device $P_D$, a random degree polynomial;
    ii. computing, with computing device $P_D$, Pedersen commitments and broadcasting Pedersen commitments and encrypted shares of secret data;
  detecting an error as follows:
    i. for each computing device that receives the share of secret data, decrypting the message and verifying that the Pedersen commitments correspond to the received shares of secret data;
    ii. for any computing device that detects that the Pedersen commitments do not correspond to the received shares of secret data, said computing device being an accusing computing device and broadcasting an accusation amongst the set of computing devices that a sending computing device is corrupt;
    iii. broadcasting, by the sending computing device, a defense to rebut the accusation;
    iv. for each computing device, determining if the defense is accurate, such that if the accusation is not correctly rebutted, computing device $P_D$ is added to a list of known corrupted computing devices Corr, and if the accusation is correctly rebutted, then the accusing computing device is added to Corr, with the protocol terminating if computing device $P_D$ is not found to be corrupt.

5. The system as set forth in claim 4, wherein using the GenPoly protocol further comprises operations of:
  distributing as follows:
    i. for each computing device that is not in the list of known corrupted computing devices Corr, generating random polynomials;
    for each said computing device that generates random polynomials that is not in Corr, computing Pedersen commitments, with each computing device then broadcasting the Pedersen commitments and encrypted shares of secret data.
    iii. adding to orr each computing device that did not broadcast Pedersen commitments;
  detecting error(s) as follows:
    i. for each computing device $P_i$ that is not in Corr, determining that each pair of shares of secret data received above corresponds to the Pedersen commitments;
    ii. for any computing device $P_i$ that detects that the Pedersen commitments do not correspond to the received pair of shares of secret data, said computing device being an accusing computing device and broadcasting an accusation amongst the set of computing devices that a sending computing device is corrupt;
    iii. if a computing device is accused, the accused computing device broadcasting a rebuttal defense that includes the correct pair of shares of secret data along with a randomness key that was used to encrypt a pair of values;
    iv. for each computing device, determining if the defense is accurate, such that if the accusation is not correctly rebutted, the accused computing device is added to a list of known corrupted computing devices Corr, and if the accusation is correctly rebutted, then the accusing computing device is added to Corr, and
    v. for each computing device, computing its share of an output polynomial.

6. The system as set forth in claim 5, wherein the one or more processors further perform an operation of using the Secret-Redistribute protocol further comprises operations of:
  performing the GenPoly protocol in parallel to generate random polynomials;
  transferring Pedersen commitments as follows:
    i. for each computing device $P_i$ that is not in Corr, broadcasting Pedersen commitments for an old secret sharing polynomial for computing devices in a new group;
    ii. for each computing device $P_j$, determining correct values for the Pedersen commitments broadcast in the previous step by a set of Pedersen commitments that are broadcast by a majority of the computing devices;
  transferring shares and interpolating as follows:
    i. for each computing device $P_i$, computing shares of masked secret-sharing polynomials and broadcasting the encrypted shares of secret data;
    for each computing device $P_j$, verifying that the encrypted shares of secret data broadcast above are correct given known Pedersen commitments;
    iii. for each computing device $P_j$, using all encrypted shares of secret data that are determined to be correct to interpolate new shares of secret data; and
  for each computing device $P_i$ in the set of computing devices, erasing all of its data.

7. The system as set forth in claim 6, wherein using the Secret-Open protocol further comprises operations of:
  for each computing device $P_i$, broadcasting its shares and signature for the shares of secret data;
  for each computing device $P_i$, verifying for each pair of points that correspond to the broadcast shares of secret data, that the shares of secret data correspond to the Pedersen commitments; and
  for each computing device $P_i$, for all the points in which the shares of secret data correspond to the Pedersen Commitments, interpolating the secret.

8. A computer-implemented method for implementing proactive secret sharing, comprising:
  an act of causing one or more processors to execute instructions stored on a non-transitory memory such that upon execution, the one or more processors perform operations of:
  using a Secret-Share protocol to distribute, by computing device $P_D$, a block of secret data comprising a plurality of shares of secret data among a set of computing devices of a synchronous network, wherein shares of secret data are transmitted electronically via a secure, authenticated broadcast channel, and wherein each computing device in the set of computing devices holds an initial share of secret data; and using at least one Secret-Redistribute protocol to periodically redistribute the plurality of shares of secret data among the set of computing devices, wherein each computing device in the set of using a Secret-Share protocol to distribute, by computing device $P_D$, a block of secret data comprising a plurality of shares of secret data among a set of computing devices, wherein each computing device in the set of computing devices holds an initial share of secret data;

using at least one Secret-Redistribute protocol to periodically redistribute the plurality of shares of secret data among the set of computing devices, wherein each computing device in the set of computing devices holds a subsequent share of secret data from the block of secret data that is independent of the initial share of secret data;

verifying accuracy of the plurality of shares of secret data using Pedersen commitments, wherein a communication complexity for the Secret-Share protocol is O(n), where n denotes a number of computing devices, and O represents big O notation; and periodically erasing, by each server, the shares of secret data to preserve security against an adversary.

9. The method as set forth in claim 8, wherein the one or more processors further perform an operation of using a Secret-Open protocol to reveal the block of secret data.

10. The method as set forth in claim 9, wherein the one or more processors further perform an operation of using a GenPoly protocol to cause the computing devices in the set of computing devices to create L random polynomials of degree D with Pedersen commitments in parallel.

11. The method as set forth in claim 10, wherein using the Secret-Share protocol further comprises operations of:
  distributing a share of secret data as follows:
   i. picking, by computing device $P_D$, a random degree polynomial;
   ii. computing, with computing device $P_D$, Pedersen commitments and broadcasting Pedersen commitments and encrypted shares of secret data;
  detecting an error as follows:
   i. for each computing device that receives the share of secret data, decrypting the message and verifying that the Pedersen commitments correspond to the received shares of secret data;
   ii. for any computing device that detects that the Pedersen commitments do not correspond to the received shares of secret data, said computing device being an accusing computing device and broadcasting an accusation amongst the set of computing devices that a sending computing device is corrupt;
   iii. broadcasting, by the sending computing device, a defense to rebut the accusation;
   iv. for each computing device, determining if the defense is accurate, such that if the accusation is not correctly rebutted, computing device $P_D$ is added to a list of known corrupted computing devices Corr, and if the accusation is correctly rebutted, then the accusing computing device is added to Corr, with the protocol terminating if computing device $P_D$ is not found to be corrupt.

12. The method as set forth in claim 11, wherein using the GenPoly protocol further comprises operations of:
  distributing as follows:
   i. for each computing device that is not in the list of known corrupted computing devices Corr, generating random polynomials;
   ii. for each said computing device that generates random polynomials that is not in Corr, computing Pedersen commitments, with each computing device then broadcasting the Pedersen commitments and encrypted shares of secret data;
   iii. adding to Corr each computing device that did not broadcast Pedersen commitments;
  detecting error(s) as follows:
   i. for each computing device $P_i$ that is not in Corr, determining that each pair of shares of secret data received above corresponds to the Pedersen commitments;
   ii. for any computing device $P_i$ that detects that the Pedersen commitments do not correspond to the received pair of shares of secret data, said computing device being an accusing computing device and broadcasting an accusation amongst the set of computing devices that a sending computing device is corrupt;
   iii. if a computing device is accused, the accused computing device broadcasting a rebuttal defense that includes the correct pair of shares of secret data along with a randomness key that was used to encrypt a pair of values;
   iv. for each computing device, determining if the defense is accurate, such that if the accusation is not correctly rebutted, the accused computing device is added to a list of known corrupted computing devices Corr, and if the accusation is correctly rebutted, then the accusing computing device is added to Corr; and
   v. for each computing device, computing its share of an output polynomial.

13. The method as set forth in claim 12, wherein the one or more processors further perform an operation of using the Secret-Redistribute protocol further comprises operations of:
  performing the GenPoly protocol in parallel to generate random polynomials;
  transferring Pedersen commitments as follows:
   i. for each computing device $P_i$ that is not in Corr, broadcasting Pedersen commitments for an old secret sharing polynomial for computing devices in a new group;
   ii. for each computing device $P_j$, determining correct values for the Pedersen commitments broadcast in the previous step by a set of Pedersen commitments that are broadcast by a majority of the computing devices;
  transferring shares and interpolating as follows:
   i. for each computing device $P_i$, computing shares of masked secret-sharing polynomials and broadcasting the encrypted shares of secret data;
   ii. for each computing device $P_j$, verifying that the encrypted shares of secret data broadcast above are correct given known Pedersen commitments;
   iii. for each computing device $P_j$, using all encrypted shares of secret data that are determined to be correct to interpolate new shares of secret data; and
  for each computing device $P_i$ in the set of computing devices, erasing all of its data.

14. The method as set forth in claim 13, wherein using the Secret-Open protocol further comprises operations of:
  for each computing device $P_i$, broadcasting its shares and signature for the shares of secret data;
  for each computing device $P_i$, verifying for each pair of points that correspond to the broadcast shares of secret data, that the shares of secret data correspond to the Pedersen commitments; and for each computing device $P_i$, for all the points in which the shares of secret data correspond to the Pedersen Commitments, interpolating the secret.

15. A computer program product for implementing proactive secret sharing, the computer program product comprising computer-readable instructions stored on a non-transitory computer-readable medium that are executable by a computer having a processor for causing the processor to perform operations of:

using a Secret-Share protocol to distribute, by computing device $P_D$, a block of secret data comprising a plurality of shares of secret data among a set of computing devices of a synchronous network, wherein shares of secret data are transmitted electronically via a secure, authenticated broadcast channel, and wherein each computing device in the set of computing devices holds an initial share of secret data;

using at least one Secret-Redistribute protocol to periodically redistribute the plurality of shares of secret data among the set of computing devices, wherein each computing device in the set of computing devices holds a subsequent share of secret data from the block of secret data that is independent of the initial share of secret data;

verifying accuracy of the plurality of shares of secret data using Pedersen commitments, wherein a communication complexity for the Secret-Share protocol is O(n), where n denotes a number of computing devices, and O represents big O notation; and periodically erasing, by each server, the shares of secret data to preserve security against an adversary.

16. The computer program product as set forth in claim 15, further comprising instructions for causing the one or more processors to perform an operation of using a Secret-Open protocol to reveal the block of secret data.

17. The computer program product as set forth in claim 16, wherein the one or more processors further perform an operation of using a GenPoly protocol to cause the computing devices in the set of computing devices to create L random polynomials of degree D with Pedersen commitments in parallel.

18. The computer program product as set forth in claim 17, wherein using the Secret-Share protocol further comprises operations of:

distributing a share of secret data as follows:
  i. picking, by computing device $P_D$, a random degree polynomial;
  ii. computing, with computing device $P_D$, Pedersen commitments and broadcasting Pedersen commitments and encrypted shares of secret data;

detecting an error as follows:
  i. for each computing device that receives the share of secret data, decrypting the message and verifying that the Pedersen commitments correspond to the received shares of secret data;
  ii. for any computing device that detects that the Pedersen commitments do not correspond to the received shares of secret data, said computing device being an accusing computing device and broadcasting an accusation amongst the set of computing devices that a sending computing device is corrupt;
  iii. broadcasting, by the sending computing device, a defense to rebut the accusation;
  iv. for each computing device, determining if the defense is accurate, such that if the accusation is not correctly rebutted, computing device $P_D$ is added to a list of known corrupted computing devices Corr, and if the accusation is correctly rebutted, then the accusing computing device is added to Corr, with the protocol terminating if computing device $P_D$ is not found to be corrupt.

19. The computer program product as set forth in claim 18, wherein using the GenPoly protocol further comprises operations of:

distributing as follows:
  i. for each computing device that is not in the list of known corrupted computing devices Corr, generating random polynomials;
  ii. for each said computing device that generates random polynomials that is not in Corr, computing Pedersen commitments, with each computing device then broadcasting the Pedersen commitments and encrypted shares of secret data;
  iii. adding to Corr each computing device that did not broadcast Pedersen commitments;

detecting error(s) as follows:
  i. for each computing device $P_i$ that is not in Corr, determining that each pair of shares of secret data received above corresponds to the Pedersen commitments;
  ii. for any computing device $P_i$ that detects that the Pedersen commitments do not correspond to the received pair of shares of secret data, said computing device being an accusing computing device and broadcasting an accusation amongst the set of computing devices that a sending computing device is corrupt;
  iii. if a computing device is accused, the accused computing device broadcasting a rebuttal defense that includes the correct pair of shares of secret data along with a randomness key that was used to encrypt a pair of values;
  iv. for each computing device, determining if the defense is accurate, such that if the accusation is not correctly rebutted, the accused computing device is added to a list of known corrupted computing devices Corr, and if the accusation is correctly rebutted, then the accusing computing device is added to Corr; and
  v. for each computing device, computing its share of an output polynomial.

20. The computer program product as set forth in claim 19, wherein the one or more processors further perform an operation of using the Secret-Redistribute protocol further comprises operations of:

performing the GenPoly protocol in parallel to generate random polynomials;

transferring Pedersen commitments as follows:
  i. for each computing device $P_i$ that is not in Corr, broadcasting Pedersen commitments for an old secret sharing polynomial for computing devices in a new group;
  ii. for each computing device $P_j$, determining correct values for the Pedersen commitments broadcast in the previous step by a set of Pedersen commitments that are broadcast by a majority of the computing devices;

transferring shares and interpolating as follows:
  i. for each computing device $P_i$, computing shares of masked secret-sharing polynomials and broadcasting the encrypted shares of secret data;

ii. for each computing device $P_j$, verifying that the encrypted shares of secret data broadcast above are correct given known Pedersen commitments;

iii. for each computing device $P_j$, using all encrypted shares of secret data that are determined to be correct to interpolate new shares of secret data; and for each computing device $P_i$ in the set of computing devices, erasing all of its data.

21. The computer program product as set forth in claim 20, wherein using the Secret-Open protocol further comprises operations of:

for each computing device $P_i$, broadcasting its shares and signature for the shares of secret data;

for each computing device $P_i$, verifying for each pair of points that correspond to the broadcast shares of secret data, that the shares of secret data correspond to the Pedersen commitments; and for each computing device $P_i$, for all the points in which the shares of secret data correspond to the Pedersen Commitments, interpolating the secret.

* * * * *